United States Patent
Casebolt et al.

(10) Patent No.: US 9,843,494 B2
(45) Date of Patent: Dec. 12, 2017

(54) CHANNEL AVAILABILITY CHECKS WITH DEVICE MONITORING

(71) Applicant: Microsoft Technology Licensing, LLC, Redmond, WA (US)

(72) Inventors: Mark W. Casebolt, Seattle, WA (US); Peter Hoang, Snoqualmie, WA (US); Vicky Svidenko, Newcastle, WA (US); David W. Russo, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 14/842,432

(22) Filed: Sep. 1, 2015

(65) Prior Publication Data

US 2017/0063665 A1    Mar. 2, 2017

(51) Int. Cl.
*H04L 12/26* (2006.01)
*H04W 72/08* (2009.01)
(Continued)

(52) U.S. Cl.
CPC ........... *H04L 43/16* (2013.01); *H04W 72/082* (2013.01); *H04W 72/085* (2013.01);
(Continued)

(58) Field of Classification Search
CPC .... H04L 43/16; H04W 24/10; H04W 72/082; H04W 72/085; H04W 74/0808;
(Continued)

(56) References Cited

U.S. PATENT DOCUMENTS 6,870,815 B2    3/2005    McFarland et al.
7,107,032 B2    9/2006    Li
(Continued)

FOREIGN PATENT DOCUMENTS

WO    2014048801 A1    4/2014

OTHER PUBLICATIONS

Tristant, Philippe, "Rlan 5 Ghz Interference to C-Band Meteorological Radars in Europe : Solutions, Lessons, Follow-Up", In Proceedings of 34th Conference on Radar Meteorology, Oct. 2009, 8 pages.
(Continued)

*Primary Examiner* — Obaidul Huq
(74) *Attorney, Agent, or Firm* — International IP Law Group, PLLC (57) ABSTRACT

The disclosed subject matter includes techniques for performing a channel availability check. A method includes initiating, via a processor of a master device, a first connection on a first wireless channel with a subordinate device and transmitting, via the processor, a beacon to the subordinate device. The method includes monitoring, via the processor, the first wireless channel for a first predetermined amount of time for a connection request from the subordinate device in response to the beacon. The method includes performing the channel availability check to detect energy profiles on a second wireless channel for a second predetermined amount of time after the first predetermined amount of time. The processor may cycle between transmitting the beacon and monitoring the first wireless channel and performing the channel availability check on the second wireless channel until a threshold time is exceeded, the connection request is detected, or an energy profile is detected.

17 Claims, 5 Drawing Sheets

(51) Int. Cl.
*H04W 74/08* (2009.01)
*H04W 84/12* (2009.01)
*H04W 16/14* (2009.01)
*H04W 36/06* (2009.01)

(52) U.S. Cl.
CPC ........ *H04W 74/0808* (2013.01); *H04W 16/14* (2013.01); *H04W 36/06* (2013.01); *H04W 84/12* (2013.01)

(58) Field of Classification Search
CPC ..... H04W 16/14; H04W 36/16; H04W 48/16; H04W 84/12; H04W 36/06
USPC .................................................. 370/241, 252
See application file for complete search history.

(56) References Cited

U.S. PATENT DOCUMENTS

| | | | |
|---|---|---|---|
| 7,606,193 | B2 | 10/2009 | McFarland et al. |
| 8,400,938 | B2 | 3/2013 | Matsuura |
| 8,654,782 | B2 | 2/2014 | Meil et al. |
| 8,982,772 | B2 | 3/2015 | Fischer et al. |
| 2004/0151137 | A1 | 8/2004 | McFarland et al. |
| 2008/0056200 | A1 | 3/2008 | Johnson |
| 2010/0097952 | A1* | 4/2010 | McHenry ............ H04L 27/0006 370/252 |
| 2010/0202359 | A1 | 8/2010 | Nallapureddy et al. |
| 2010/0302966 | A1* | 12/2010 | Matsuura .............. H04W 16/14 370/252 |
| 2012/0026941 | A1* | 2/2012 | Ahmad ................. H04W 48/16 370/328 |
| 2012/0044888 | A1 | 2/2012 | Adling et al. |
| 2012/0140646 | A1 | 6/2012 | Stephens |
| 2013/0194944 | A1 | 8/2013 | Soyak et al. |
| 2013/0217340 | A1 | 8/2013 | Nakatake |

OTHER PUBLICATIONS

Wen, et al., "Radar detection for 802.11a systems in 5 GHz band", In Proceedings of International Wireless Conference on Communications, Networking and Mobile Computing, Volume, Sep. 23, 2009, pp. 492-494.
ETSI EN 301 893, V1.8.1, Broadband Radio Access Networks (BRAN) Access Networks (BRAN); 5 GHz high performance RLAN; Harmonized EN covering essential requirements of article 3.2 of the R&TTE Directive, Mar. 20, 2015, 94 pages. Retrieved from the Internet: URL:http:/w/ww.etsi.org/deliver/etis _en/31800_301899/301893/01.08.01_60/en_301893v010801p.pdf—[retrieved on Apr. 15, 2016].
International Search Report and Written Opinion for PCT Application No. PCT/2016/044950 dated Oct. 27, 2016, 12 pages.

\* cited by examiner

CHANNEL AVAILABILITY CHECKS WITH DEVICE MONITORING

BACKGROUND

Wireless master devices may use available Dynamic Frequency Selection (DFS) channels in addition to typically used wireless local area network channels. For example, access points may use different wireless channels of a DFS band in order to prevent interference caused by using the same wireless local area network channels used by other nearby devices.

SUMMARY

The following presents a simplified summary of the innovation in order to provide a basic understanding of some aspects described herein. This summary is not an extensive overview of the disclosed subject matter. It is intended to neither identify key elements of the disclosed subject matter nor delineate the scope of the disclosed subject matter. Its sole purpose is to present some concepts of the disclosed subject matter in a simplified form as a prelude to the more detailed description that is presented later.

Another implementation provides for a system for performing a channel availability check. The system can include a processor and a computer-readable memory storage device storing executable instructions that can be executed by the processor to cause the processor to initiate a first connection on a first wireless channel with a subordinate device and transmit a beacon to the subordinate device, and to monitor the first wireless channel for a first predetermined amount of time for a connection request from the subordinate device in response to the beacon. The system can include executable instructions that can be executed by the processor to cause the processor to perform the channel availability check to detect energy profiles on a second wireless channel for a second predetermined amount of time after the first predetermined amount of time. The processor can cycle between transmitting the beacon and monitoring the first wireless channel and performing the channel availability check on the second wireless channel until a threshold time is exceeded, the connection request is detected, or an energy profile is detected. The system also can include executable instructions that can be executed by the processor to cause the processor to migrate the first connection to the second wireless channel if the threshold time is exceeded.

Another implementation provides method for performing a channel availability check. The method can include initiating, via a processor of a master device, a first connection on a first wireless channel with a subordinate device. The method can also include transmitting, via the processor, a beacon to the subordinate device. The method can further include monitoring, via the processor, the first wireless channel for a first predetermined amount of time for a connection request from the subordinate device in response to the beacon. The method can also further include performing the channel availability check to detect energy profiles on a second wireless channel for a second predetermined amount of time after the first predetermined amount of time. The processor can cycle between transmitting the beacon and monitoring the first wireless channel and performing the channel availability check on the second wireless channel until a threshold time is exceeded, the connection request is detected, or an energy profile is detected.

Another implementation provides for one or more computer-readable memory storage devices for storing computer readable instructions that, when executed by one or more processing devices, instruct the performance of a channel availability check. The computer-readable instructions can include code to initiate a first connection on a first wireless channel with a subordinate device and transmit a beacon to the subordinate device. The computer-readable instructions can include code to monitor the first wireless channel for a first predetermined amount of time for a connection request from the subordinate device in response to the beacon. The computer-readable instructions can include code to perform the channel availability check to detect energy profiles on a second wireless channel for a second predetermined amount of time after the first predetermined amount of time. The one or more processing devices can cycle between transmitting the beacon and monitoring the first wireless channel and performing the channel availability check on the second wireless channel until a threshold time is exceeded, the connection request is detected, or an energy profile is detected. The computer-readable instructions can include code to migrate the first connection to a second connection on the second wireless channel if the threshold time is exceeded.

The following description and the annexed drawings set forth in detail certain illustrative aspects of the disclosed subject matter. These aspects are indicative, however, of a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

DETAILED DESCRIPTION

Wireless communications are subject to noise from a variety of interference sources, especially in the crowded ISM (Instrumentation, Scientific, and Medical) bands commonly used for local wireless networks. Such interference can degrade user experience. In human interface devices, where latency and responsiveness are commonly expected to operate in the single digit millisecond range, interference adds uncertainty and degrades the human interface experience. For example, in gaming consoles and PC-based gaming configurations that have low latency, connected human interface devices such as controllers may become unusable due to effects of interference on latency.

In some embodiments, human interface wireless connections can be operated in a frequency band that has few, if any, interference sources. For example, some bands of the wireless spectrum are used infrequently and thus commonly available. Recognizing that some frequency band allocations for radar and other military usage are rarely occupied across the broader population, the Federal Communications Commission (FCC) and international regulatory bodies have initiated the concept of fair usage or "Dynamic Frequency Allocation". The process of entering these channels is known as "Dynamic Frequency Selection" (DFS). The frequency bands involved are commonly known as DFS channels.

DFS includes a Channel Availability Check (CAC) process. The CAC process is a clearance process for using DFS that can take anywhere from 60 seconds to several minutes to determine if each DFS channel is available and can be used. During the CAC period of the DFS as currently implemented, the access point is unavailable to respond to subordinate device requests. Access points are unable to interact with subordinate devices during the CAC period because the currently approved method has the access points abandon all other activities in order to perform CAC 100% of the time for 60 seconds. Once the access point determines that the DFS channel is clear of radar, the access point can then occupy that channel. After DFS operation is initiated, approved DFS subordinate devices may then operate with the access point (AP) in this band of a DFS channel. However, there are certain classes of wireless devices that cannot allow long disruptions in subordinate service. For example, human interface devices are expected to operate in the single digit millisecond range with respect to latency. Furthermore, the current CAC process may not detect all radar signals due to the length of the pulse repetition period of some radar such as weather radar.

This disclosure describes techniques to perform an improved channel availability check (CAC). In particular, using a partial duty cycle, the duration of a CAC can be extended to 15 minutes or more while maintaining availability of a master wireless device to one or more subordinate devices by cycling between monitoring for responses to beacons and performing the CAC. The beacon can thus act as a time synchronization element. In addition to keeping client devices informed of the general housekeeping functions, such as current operating channel and perspective future channel changes, the beacon can provide a time tick so that quiescent wireless client devices know when to signal for attention with a high probability of being heard. As used herein, duty cycle refers to a fraction or percentage of cycle time that a CAC is performed. A beacon, as used herein, refers to a management frame that contains information about a wireless local area network. A cycle refers to a combination of a period of monitoring a first channel for connection requests with a period of performing a CAC. For example, a beacon can be sent to one or more subordinate devices via a non-DFS channel at a predetermined interval such as every 100 milliseconds or any other suitable time period. A CAC may be performed on a potentially available DFS channel for a predetermined time after monitoring for a connection request from any number of subordinate devices in response to the beacon for another predetermined time. Once a predetermined threshold full CAC time is exceeded, such as at least 15 minutes or any other suitable time, then the DFS channel may be considered tested and the master and subordinate devices may begin using the DFS channel. For example, the full CAC time can be equal to any time period including but not limited to 15 minutes. In some examples, in-service monitoring may be performed while the master device is servicing subordinate devices on the tested DFS channel.

The techniques thus enable maintenance of uninterrupted data transmission between two wireless devices, while improving upon regulatory detection requirements on DFS channels. For example, the techniques allow wireless devices to avoid the inhibitive "dead space" incurred with the 100% duty cycle CAC scan of the current DFS CAC entry as discussed in greater detailed with respect to FIG. 1 below. In addition, the techniques herein enable more efficient wireless channel migration by scanning additional wireless channels and detecting available channels via a single integrated circuit. Moreover, the techniques improve the detectability of radar signatures during a CAC scan by increasing the amount of time that the scan is performed. These techniques are described in more detail herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 7, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the disclosed subject matter may be implemented as a method, apparatus, or article of manufacture using standard programming and engineering techniques to produce software, firmware, hardware, or any combination thereof to control a computing device to implement the disclosed subject matter. The term "article of manufacture,"

as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. Moreover, computer-readable storage media does not include communication media such as transmission media for wireless signals. In contrast, computer-readable media, i.e., not storage media, may include communication media such as transmission media for wireless signals.

Figure 1:
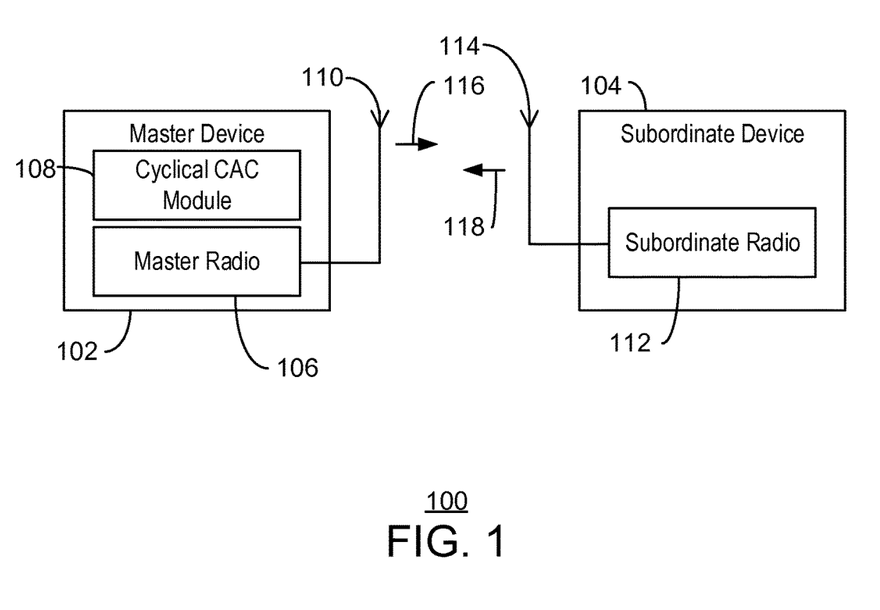
FIG. 1 is a block diagram of an example operating environment configured for implementing various aspects of the techniques described herein.

FIG. 1 is a block diagram of an example operating environment configured for implementing various aspects of the techniques described herein. The example system of FIG. 1 is referred to generally by the reference number 100.

The example system 100 includes a master device 102 and a subordinate device 104. The master device 102 includes a master radio 106, a cyclical Channel Availability Check (CAC) module, and an antenna 110 that is coupled to the master radio 106. The subordinate device 104 includes a subordinate radio 112 coupled to an antenna 114. Antenna 110 is shown sending a beacon 116 and receiving a connection request 118. Antenna 114 is likewise shown sending connection request 118 and receiving beacon 116.

In the example system 100, to maintain uninterrupted services between the master device 102 and the subordinate device 104, and at the same time meet regulatory detection probability requirements on the DFS channels, the master device 102 may momentarily check a status of the subordinate device 104 and spend a majority of time performing a CAC on a partial duty cycle basis extended for a period of time that exceeds a minimum threshold. In some embodiments, the minimum threshold can represent any suitable period of time such as 15 minutes, among others. For example, the partial duty cycle basis may be 93%, which indicates that the master device 102 may spend approximately 93% of a time period performing a CAC. In some examples, a cycle may last a fraction of a second and be repeated for an extended period of time. A cycle can include a period of monitoring for a connection request from a subordinate device and a period of performing a CAC.

According to techniques described herein, the cyclical CAC module 108 can allow the master device to transmit a beacon 116 on a non-DFS wireless channel via a master radio 106 and listen for a connection request 118 via the master radio from a subordinate device for a first predetermined amount of time. For example, the first predetermined amount of time may be up to 5 milliseconds, or any other suitable time. If the master device 102 does not detect connection request 118 from the subordinate device 104 within the first predetermined amount of time after transmitting the beacon 116, the master device 102 can switch over to a DFS channel and perform a CAC check on the DFS channel. For example, the master device 102 can switch over to a DFS channel within a short time such as 1 millisecond and perform CAC for at least a second predetermined amount of time such as 93 milliseconds, or any other suitable time. After performing the CAC, the master device 102 can switch over to a non-DFS channel within another short period of time such as 1 millisecond and send another beacon 116 to the subordinate device 104 via the master radio again. This process can be referred to as a 93% duty cycle CAC. For example, 93 of a total of 100 milliseconds in the repeated cycle can be allocated for the CAC scan. In some examples, the 93% duty cycle can be repeated over a 100 milliseconds time frame. In some embodiments, the master device 102 can spend any suitable amount of time performing a CAC check on a DFS channel and any suitable amount of time monitoring for connection requests in response to beacons. In some examples, the 93% duty cycle CAC can also be performed within an extended CAC duration of at least 15 minutes instead of, for example, the 60 seconds CAC typically use to assess the presence of radar on a DFS channel. By increasing the CAC duration from 60 seconds to at least 15 minutes, the techniques described herein enable more reliable detection of energy profiles such as an energy profile for radar. For example, weather radars may be particularly detected more reliably due to the long scanning intervals of weather radars.

In some examples, if there is an interruption from a subordinate device 104 within the CAC duration, the master device 102 can stop the CAC process and service the subordinate device 104 on the non-DFS channel. Thus, the techniques herein avoid the one minute down time associated with traditional CAC scans, allowing a subordinate device 104 to be serviced by the master device 102. If there is no interruption from a subordinate device 104 via connection requests 118 during the CAC duration, the master device 102 can continue to perform the CAC scan. If the CAC process clears the channel for the presence of radar, the master device 104 can then occupy the DFS channel and begin an in-service monitoring process. As used herein, an in-service monitoring process refers to a monitoring process in which an access point (AP) can listen for radar signatures when not sending data to clients. For example, the in-service monitoring may be performed on a DFS channel being used for an active connection once one or more clients have entered the DFS band. When interactive communication is occurring between the AP and clients, the listen process can be sporadic with a variable interval for listening that is driven by the data content of the communications.

Still referring to FIG. 1, during in-service monitoring, the master device 102 can begin to transmit beacons at regular intervals, such as every 100 milliseconds or any other suitable time period, on the DFS channel, and then switch to receiver mode to listen for connection requests from the subordinate device 104 and at the same time monitor for radar. The master device 102 may thus be able to monitor for radar while in a receiver mode. If the master device 102 detects radar during in-service monitoring, the master device 102 will communicate to the subordinate device 104 to vacate the DFS channel and move to a non-DFS channel. For example, the master device 102 can initiate a new connection on the non-DFS channel and send a beacon to the subordinate device 104 with the new channel. The subordinate device 104 can then migrate to the new channel in response to the beacon.

As discussed in detail with respect to FIG. 2 below, the 93% duty cycle CAC statistically exceeds FCC radar detection success rate requirements. For example, an aggregate success rate of 80% should pass for radar type 1 to 4 under applicable FCC requirements. For type 5 and 6 radar, the aggregate success rate should pass 80%, and 70%, respectively. As discussed below, the present techniques exceed these detection success requirements while also avoiding the one minute down time associated with traditional CAC scans.

The diagram of FIG. 1 is not intended to indicate that the example system 100 is to include all of the components shown in FIG. 1. Rather, the example system 100 can include fewer or additional components not illustrated in FIG. 1 (e.g., additional devices, radios, antennas, etc.).

Figure 2:
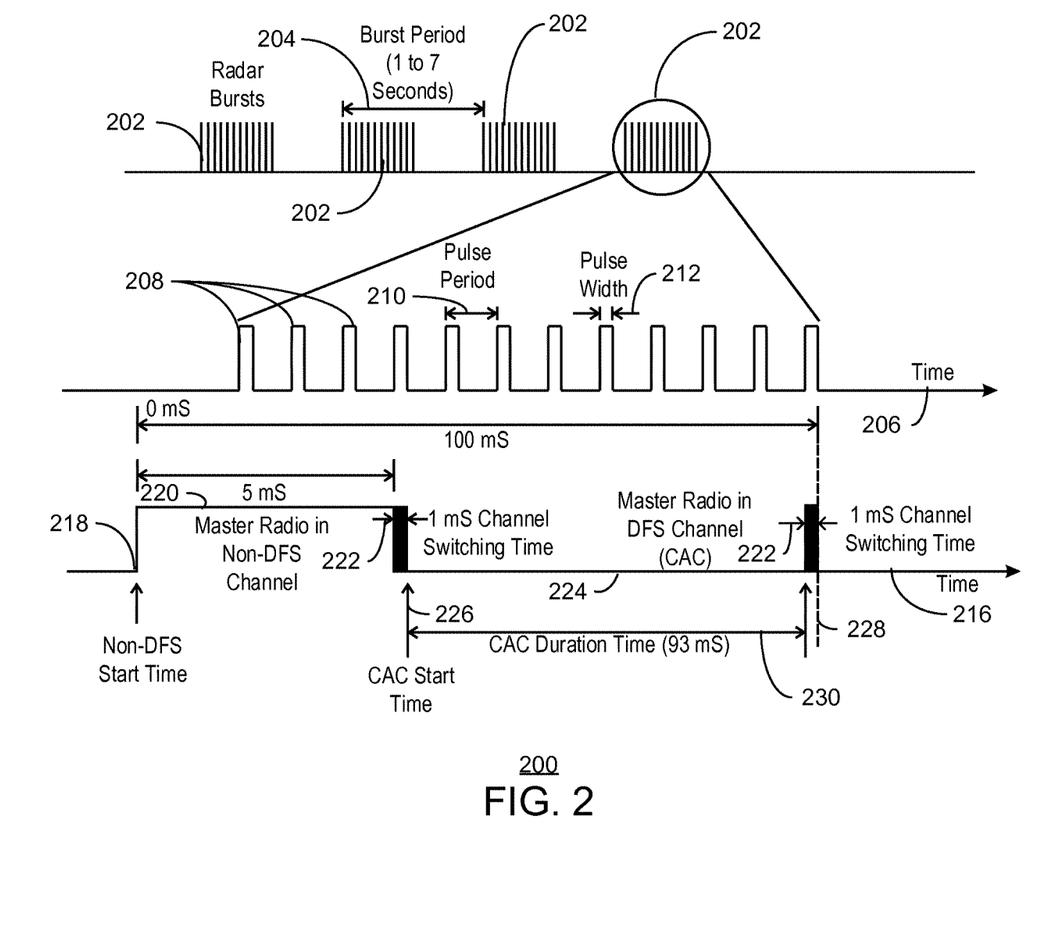
FIG. 2 is a timing diagram of an example radar waveform compared to an example duty cycle according to techniques described herein.

FIG. 2 is a timing diagram of an example radar waveform compared to an example duty cycle according to techniques described herein. The example timing diagram of FIG. 2 is generally referred to by the reference number 200 and can be implemented by, for example, the master device 102 of FIG. 1 or the computing device 402 of FIG. 4.

In FIG. 2, a series of radar bursts 202 are shown with a burst period 204 of one to seven seconds. A timeline 206 depicts a radar burst 202 in detail. The radar burst 202 includes a plurality of pulses 208 having a pulse period 210 and a pulse width 212. Below the timeline 206, a duty cycle 200 of length 100 milliseconds 214 is shown on another timeline 216. The duty cycle 200 begins at non-DFS start time 218. For an amount of time of about 5 milliseconds, the master radio is using a non-DFS channel 220. A one millisecond channel switching time 222 is shown between the non-DFS channel setting 220 and a channel availability check (CAC) 224 having a duration time of about 93 milliseconds. Another one millisecond channel switching time 222 is shown following the CAC check 224. The end of the second 1 millisecond switching time 222 also marks the end 228 of one CAC cycle 200.

As shown in FIG. 2, radar signals may be grouped into radar bursts 202 having burst periods typically between one and seven seconds. Each radar burst 202 may include a plurality of radar 208 pulses having a pulse period 210 and pulse width 212 that may vary based on radar type. For example, for radar type 5, pulse period and pulse width are 1 millisecond, and 50 microseconds, respectively.

As can be seen in FIG. 2, a CAC with a duty cycle of 93% and a total cycle time of 100 milliseconds can detect most radar within the duration time of 93 milliseconds. Using statistics, the probability of a particular success rate using the present techniques can be calculated given a particular radar. For example, type 5 radar can be calculated because type 5 radar is the hardest to detect due to the longer pulse period that radar 5. As calculated statistically, the cumulative probability of detecting a radar type 5 at a success rate of 80% or higher is 99.9959%. As the FCC threshold success rate is 80%, the present techniques more than exceed the FCC threshold success rate.

Still referring to FIG. 2, to simulate the probability of radar detection for 93% duty cycle CAC, a non-DFS start time 218 can be randomly generated between 0 to 100 milliseconds. As seen in the CAC duty cycle alignment with the radar waveform, the non-DFS start time 218 depicts the start time when the master radio occupies a non-DFS channel to send a beacon to a subordinate device. The CAC start time 226 can be 6 milliseconds after the non-DFS start time. At this time, the master radio can switch to a DFS channel and start the CAC. The CAC duration time 230 is the duration of time the master radio spent on CAC that is aligned to the radar pulses. If the CAC duration time 230 is less than the duration of two radar pulses, the master radio may fail to detect radar. Otherwise, if the CAC duration time is greater than or equal to the duration of two radar pulses, the master radio can successfully detect radar. A large number of simulations were performed using the 93% partial duty cycle and the probability of detecting a type 5 radar operating on a DFS channel was shown to exceed 80%.

The diagram of FIG. 2 is not intended to indicate that the example timing diagram 200 is to include all of the components shown in FIG. 2. Rather, the example timing diagram 200 can include fewer or additional components not illustrated in FIG. 2 (e.g., additional radar bursts, pulses, duty cycles, etc.)

Figure 3:
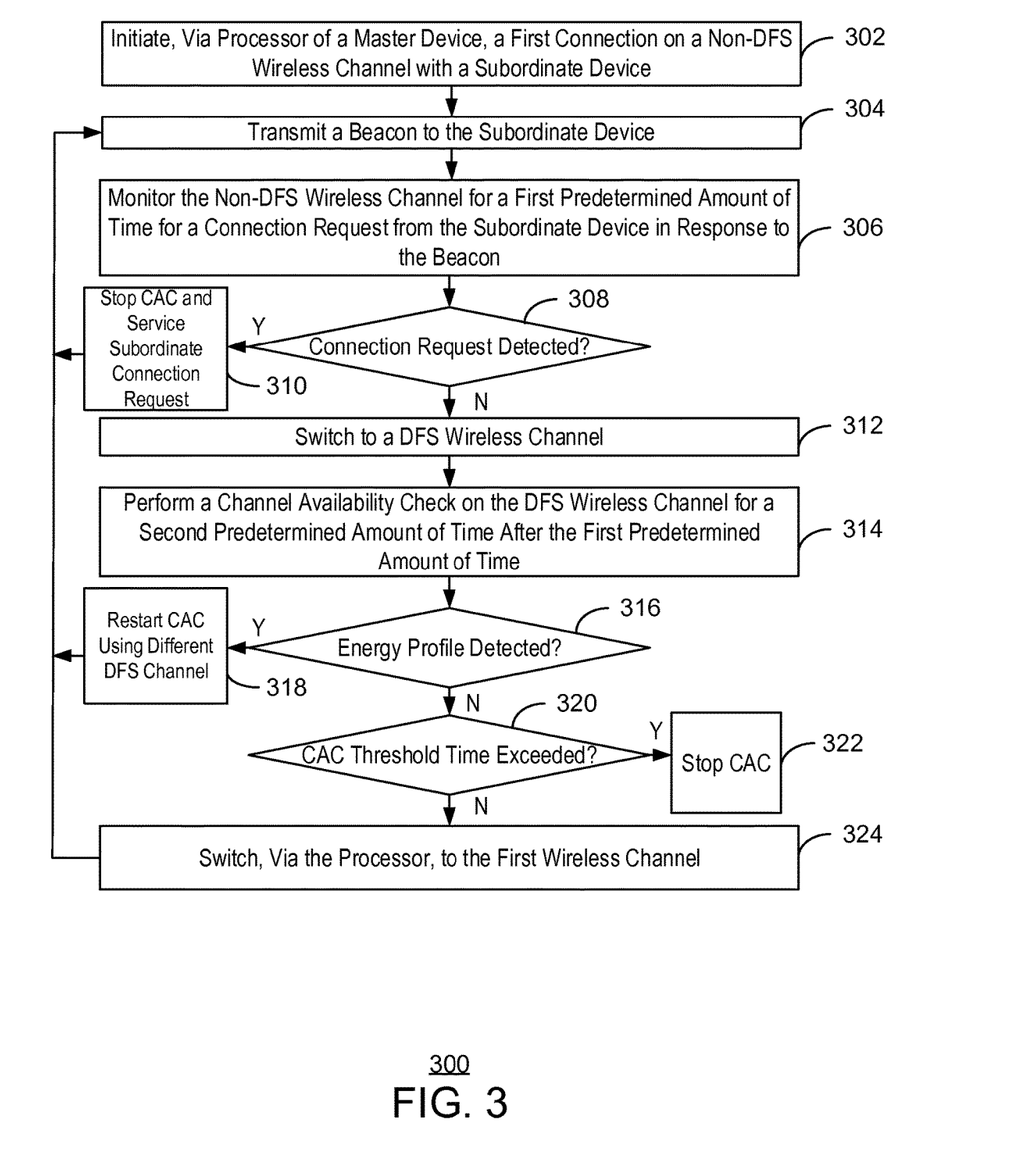
FIG. 3 shows a process flow diagram of an example method for performing cyclical channel availability checks.

FIG. 3 shows a process flow diagram of an example method for performing cyclical CAC checks. The example method is generally referred to by the reference number 300 and can be implemented using computer 402 as described below. The example method 300 can be performed by the example system 100 using the example CAC check 200, or the master device 102 of FIG. 1.

At block 302, the master device initiates, via a processor of the master device, a first connection on a non-DFS wireless channel with a subordinate device. For example, the non-DFS channel may be a wireless local area network channel. Since non-DFS channels are pre-cleared for commercial use, the master device may use the non-DFS channel without any monitoring. For example, a beacon with the non-DFS wireless channel may have been transmitted and received by the subordinate device, and the subordinate device may have transmitted a connection request to the master device. The master device may service the subordinate device on the non-DFS channel at 100% duty cycle.

At block 304, the master device transmits, via the processor, a beacon to the subordinate device. For example, the beacon can be a management frame for wireless local area networks that contains information about the wireless network. In some examples, the transmitted beacon can be the beginning of a cycle that ends at block 324 and starts again at block 304. For example, the cycle may last 100 milliseconds to coincide with the typical length of a default wireless beacon interval. In some examples, the cycle may begin after a period of time of subordinate device inactivity. For example, the CAC cycle may begin after a predetermined number of beacons have been sent out by the master device and no connection request was received in response.

At block 306, the master device monitors, via the processor, the non-DFS wireless channel for a first predetermined amount of time for a connection request from the subordinate device in response to the beacon. For example, the connection request may be associated with an event from the subordinate device. The event may be, for example, an input from the subordinate device. For example, the input may correspond to the push of a button on a wireless controller or any other suitable input from the wireless controller or another input device.

At block 308, the master device determines whether a connection request is detected. If a connection request is detected, then the method proceeds at block 310. If no connection request is detected, then the method may proceed at block 312.

At block 310, the master device stops the CAC and services a subordinate connection request. For example, the subordinate connection request may correspond to an input from the subordinate device. The master device may service the connection request and receive the input from the subordinate device. The subordinate device can then be serviced via the non-DFS wireless channel as usual for any amount of time. In some examples, once a predetermined time of inactivity at the subordinate device has passed, or a predetermined amount of beacons have been sent without any connection response, then the master device may again start the CAC cycle by transmitting a beacon to the subordinate device as described in block 304 above.

At block 312, the master device switches to a DFS wireless channel. In some embodiments, although DFS is used for example, the DFS channel may be any wireless channel subject to restrictions on usage similar to DFS channels. The master device may tune the master radio to the frequency of the DFS wireless channel to monitor for radar signals, among other energy profiles.

At block 314, the master device performs the channel availability check to detect energy profiles on the DFS wireless channel for a second predetermined amount of time after the first predetermined amount of time. For example, the second predetermined amount of time can be a function of the duty cycle to the total time of one cycle. Thus, if the duty cycle is 93% and the total time of one cycle is 100 milliseconds, then the second predetermined amount of time can be 93 milliseconds. In some embodiments, the second predetermined amount of time and the first predetermined period of time can be represented by a formula or ratio. For example, the master device can perform a CAC check for a second predetermined period of time in relation to a first period of time in which the master device attempts to detect a connection request from a subordinate device.

At block 316, the master device determines whether an energy profile has been detected. For example, the energy profile may correspond to any suitable radar type such as radar type 1, 2, 3, 4, 5, or 6. In some examples, the energy profile may correspond to a weather radar. If an energy profile is detected, then the method may continue at block 318. If no energy profile is detected during the second predetermined amount of time, then the method can continue at block 324.

At block 318, the master device restarts the CAC using a different DFS channel. For example, the master device may have a store of potentially available DFS channels and restart the CAC using another channel from the list of potentially available DFS channels. In some examples, the master device may also store the detected energy profile in a temporary black list. For example, the detected energy profiles may not be selected for CAC for a predetermined amount of time after detection.

At block 320, the master device determines whether a CAC threshold time has been exceeded. For example, threshold time may be a full CAC time that can be equal to any time period, including but not limited to 15 minutes.

If the CAC threshold time has been exceeded, then the method proceeds to block 322, and the CAC ends. If the CAC threshold time has not been exceeded, then the method can proceed to block 324. For example, the CAC threshold time may be equal to a full CAC time of 15 minutes or more.

At block 322, the master device stops the CAC. Once the CAC is stopped, the master device can create a second connection via the tested DFS channel and send a beacon to the subordinate device(s) including the DFS channel. In some examples, the master device may then perform in-service monitoring on the DFS channel while servicing the subordinate device(s). If the master device detects an energy profile during in-service monitoring, then the master device may create a third connection on the non-DFS wireless channel and migrate the subordinate device(s) from the second connection on the DFS channel to the third connection on the non-DFS channel. For example, the master device may send a beacon including the non-DFS channel and an instruction to migrate to the non-DFS channel.

At block 324, the master device switches, via the processor, to the first wireless channel. For example, the master device may tune the master radio to the frequency of the first non-DFS wireless channel. The method may then continue to block 304, where the master device may send another beacon to the subordinate device(s). As described above, the CAC cycle may continue until a connection request is detected at block 308, an energy profile is detected at block 316, or the CAC threshold time is exceeded at block 320.

In some examples, the CAC check may be performed to clear a DFS channel for radar or other preferred uses before using the channel. For example, the master device may use the DFS channel if there is no radar or other applications currently using the DFS channel. In some examples, the master device and/or the subordinate device may have a predetermined transmitting power. For example, the predetermined transmitting power may be 10 milliwatts or less when transmitting at DFS frequencies. Operating at a low power may reduce the potential for the master or subordinate device to interfere with devices having priority over the DFS frequencies.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

Figure 4:
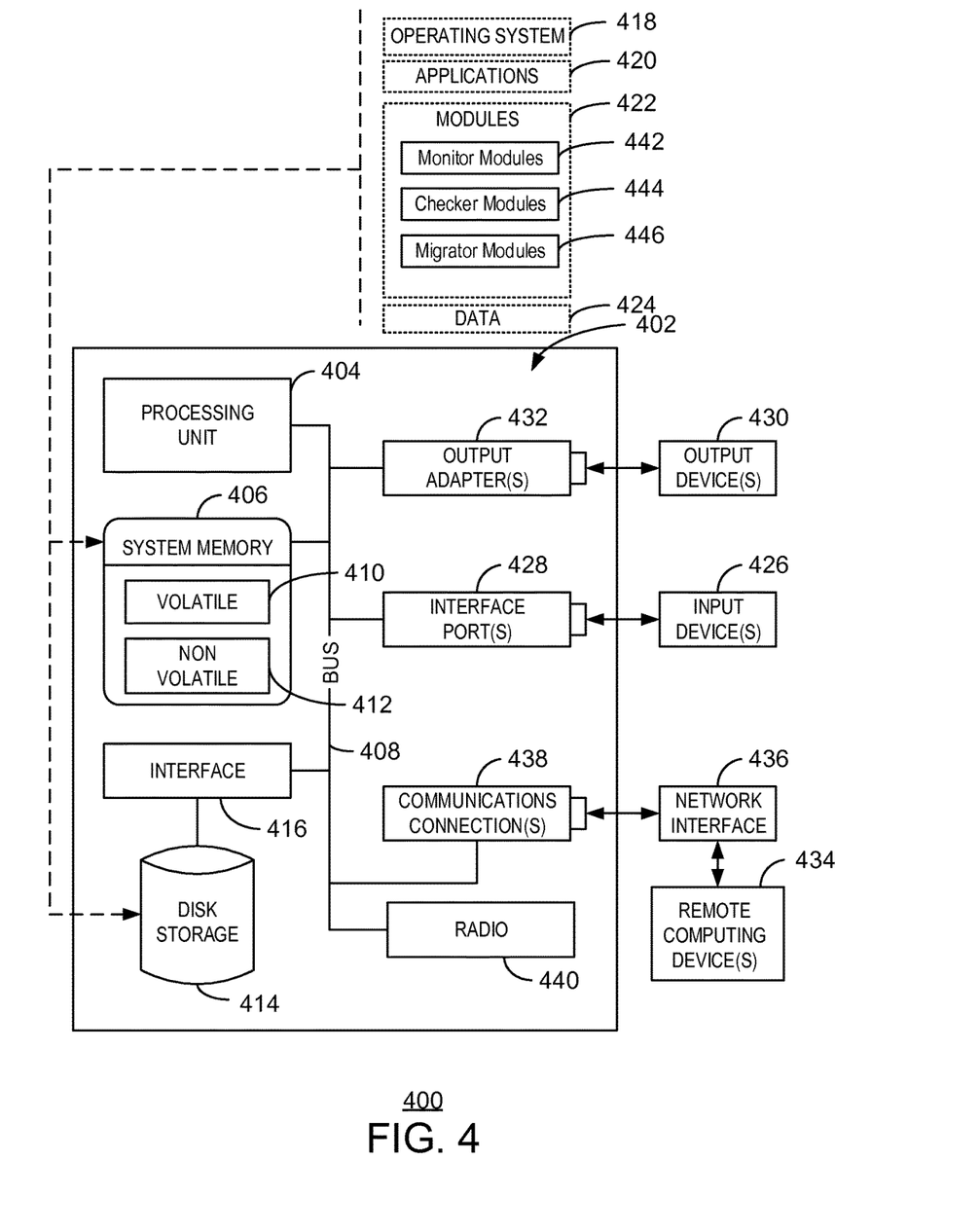
FIG. 4 is a block diagram of an example system for performing cyclical channel availability checks.

FIG. 4 is a block diagram of an example system for performing cyclical channel availability checks. The example system 400 includes a computer 402. The computer 402 includes a processing unit 404, a system memory 406, and a system bus 408. For example, the computer 402 may be the master device 102 of FIG. 1 above. In some examples, the computer 402 can be a gaming console.

The system bus 408 couples system components including, but not limited to, the system memory 406 to the processing unit 404. The processing unit 404 can be any of various available processors. Dual microprocessors and other multiprocessor architectures also can be employed as the processing unit 404.

The system bus 408 can be any of several types of bus structure, including the memory bus or memory controller, a peripheral bus or external bus, and a local bus using any variety of available bus architectures known to those of ordinary skill in the art. The system memory 406 includes computer-readable storage media that includes volatile memory 410 and nonvolatile memory 412.

The basic input/output system (BIOS), containing the basic routines to transfer information between elements within the computer 402, such as during start-up, is stored in nonvolatile memory 412. By way of illustration, and not limitation, nonvolatile memory 412 can include read-only memory (ROM), programmable ROM (PROM), electrically programmable ROM (EPROM), electrically erasable programmable ROM (EEPROM), or flash memory.

Volatile memory 410 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 402 also includes other computer-readable media, such as removable/non-removable, volatile/non-volatile computer storage media. FIG. 4 shows, for example a disk storage 414. Disk storage 414 includes, but is not limited to, devices like a magnetic disk drive, floppy disk drive, tape drive, Jaz drive, Zip drive, LS-210 drive, flash memory card, or memory stick.

In addition, disk storage 414 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 414 to the system bus 408, a removable or non-removable interface is typically used such as interface 416.

It is to be appreciated that FIG. 4 describes software that acts as an intermediary between users and the basic computer resources described in the suitable operating environment 400. Such software includes an operating system 418. Operating system 418, which can be stored on disk storage 414, acts to control and allocate resources of the computer 402.

System applications 420 take advantage of the management of resources by operating system 418 through program modules 422 and program data 424 stored either in system memory 406 or on disk storage 414. It is to be appreciated that the disclosed subject matter can be implemented with various operating systems or combinations of operating systems.

A user enters commands or information into the computer 402 through input devices 426. Input devices 426 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. For example, the subordinate device 104 of FIG. 1 may be an input device 426. The input devices 426 connect to the processing unit 404 through the system bus 408 via interface ports 428. Interface ports 428 include, for example, a serial port, a parallel port, a game port, and a universal serial bus (USB).

Output devices 430 use some of the same type of ports as input devices 426. Thus, for example, a USB port may be used to provide input to the computer 402, and to output information from computer 402 to an output device 430.

Output adapter 432 is provided to illustrate that there are some output devices 430 like monitors, speakers, and printers, among other output devices 430, which are accessible via adapters. The output adapters 432 include, by way of illustration and not limitation, video and sound cards that provide a means of connection between the output device 430 and the system bus 408. It can be noted that other devices and systems of devices provide both input and output capabilities such as remote computers 434.

The computer 402 can be a server hosting various software applications in a networked environment using logical connections to one or more remote computers, such as remote computers 434. The remote computers 434 may be client systems configured with web browsers, PC applications, mobile phone applications, and the like. The remote computers 434 can be a personal computer, a server, a router, a network PC, a workstation, a microprocessor based appliance, a mobile phone, a peer device or other common network node and the like, and typically includes many or all of the elements described relative to the computer 402.

Remote computers 434 can be logically connected to the computer 402 through a network interface 436 and then connected via a communication connection 438, which may be wireless. Network interface 436 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 438 refers to the hardware/software employed to connect the network interface 436 to the bus 408. While communication connection 438 is shown for illustrative clarity inside computer 402, it can also be external to the computer 402. The hardware/software for connection to the network interface 436 may include, for exemplary purposes, internal and external technologies such as, mobile phone switches, modems including regular telephone grade modems, cable modems and DSL modems, ISDN adapters, and Ethernet cards.

The computer 402 can further include a radio 440. For example, the radio 440 can be a Dual Band 802.11 class monolithic Integrated Circuit (IC). The radio 440 may be a 1×1 radio configured to operate in different bands as discussed above with reference to FIG. 1. In some examples, the radio may be a 2×2 radio, a 3×3 radio, or any other suitable radio.

An example processing unit 404 for the server may be a computing cluster. Additionally, the disk storage 414 can include modules 422 and store various types of data 424 used to detect priority devices. For example, the disk storage 414 may be an enterprise data storage system, for example, storing data 424 such as energy profiles. The modules 422 include executable instructions that can be executed by the processor to cause the processor to perform the method 300 of FIG. 3.

The computer 402 includes one or more modules 422 configured to perform cyclical channel availability checks, including a monitor module 442, a checker module 444, and a migrator module 446. The monitor module 442 can initiate a first connection on a first wireless channel with a subordinate device and transmit a beacon to the subordinate device. For example, the first wireless channel may be any non-DFS wireless channel. The monitor module 442 can also monitor the first wireless channel for a first predetermined amount of time for a connection request from the subordinate device in response to the beacon. In some examples, the beacon and the connection request may be transmitted at a predetermined transmitter power. For example, if the beacon or the connection request is transmitted using a DFS channel, then the beacon or connection request may be transmitted at a predetermined transmitted power of 10 milliwatts or less. The checker module 444 can perform the channel availability check to detect energy profiles on a second wireless channel for a second predetermined amount of time after the first predetermined amount of time. For example, the second wireless channel can be a dynamic frequency selection (DFS) channel. The monitor module 442 and the checker module 444 can cycle between transmitting the beacon and monitoring the first wireless channel and performing the channel availability check on the second wireless channel until a threshold time is exceeded, the connection request is detected, or an energy profile is detected. The migration module 446 can migrate the first connection to the second wireless channel if the threshold time is exceeded. For example, the threshold time may be equal to a full CAC time. For example, the full CAC time may be at least 15 minutes.

In some examples, the monitor module can stop cycling between performing the channel availability check and monitoring the first wireless channel if a connection request is detected, and service the subordinate device on the first wireless channel. In some examples, the monitor module can stop cycling between performing the channel availability check and monitoring the first wireless channel and service the subordinate device via the first wireless channel if the energy profile is detected. In some examples, the monitor module can monitor for the energy profile on the second wireless channel after the first connection is migrated. For example, the monitor module can perform in-service monitoring on a DFS channel.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, additional MACs, etc.). Furthermore, any of the functionalities of the energy profile module 440 can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 5:
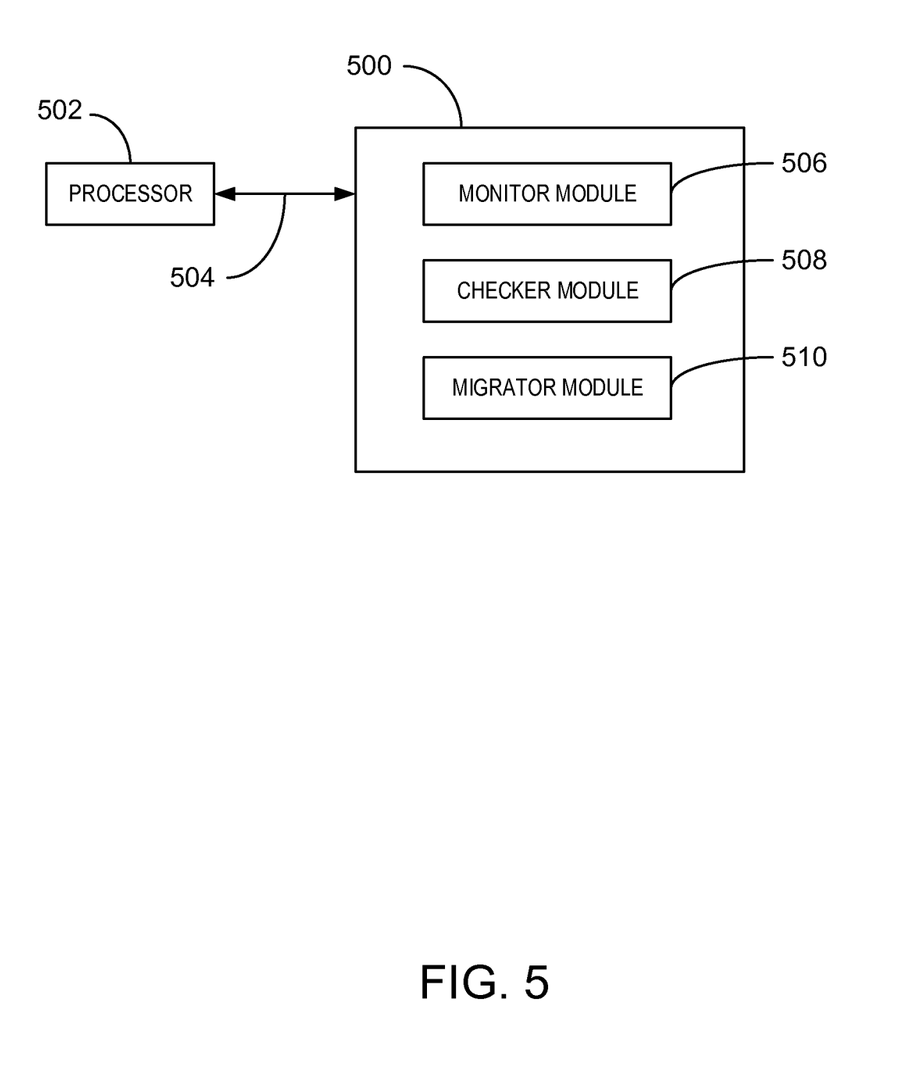
FIG. 5 is a block diagram showing an example tangible, computer-readable storage medium that can be used to perform cyclical channel availability checks.

FIG. 5 is a block diagram showing an example tangible, computer-readable storage medium that can be used to perform cyclical channel availability checks. The tangible, computer-readable storage media 500 can be accessed by a processor 502 over a computer bus 504. Furthermore, the tangible, computer-readable storage media 500 can include code to direct the processor 502 to perform the current methods.

The various software components discussed herein can be stored on the tangible, computer-readable storage media 500, as indicated in FIG. 5. For example, the tangible computer-readable storage media 500 can include a monitor module 506, a checker module 508, and a migrator module 510. In some implementations, the monitor module 506 includes code to initiate a first connection on a first wireless channel with a subordinate device and transmit a beacon to the subordinate device. For example, the first wireless channel may be any non-DFS channel. The subordinate device may be a wireless controller. The monitor module 506 can also include code to monitor the first wireless channel for a first predetermined amount of time for a connection request from the subordinate device in response to the beacon. For example, the first predetermined amount of time may be up to five milliseconds. The checker module 508 can include code to perform the channel availability check to detect energy profiles on a second wireless channel for a second predetermined amount of time after the first predetermined amount of time. For example, the second predetermined amount of time may be 93 milliseconds. The monitor module 506 and checker module 508 may further include code to cycle between transmitting the beacon and monitoring the first wireless channel and performing the channel availability check on the second wireless channel until a threshold time is exceeded, the connection request is detected, or an energy profile is detected. For example, a cycle may have a duration of 100 milliseconds. The migrator module 510 may include code to migrate the first connection to a second connection on the second wireless channel if the threshold time is exceeded.

In some examples, the monitor module 506 may also include code to perform in-service monitoring on the second wireless channel after the first connection is migrated. For example, the monitor module 506 can monitor for energy profiles while the second wireless channel is used to service the subordinate device. In some examples, the migrator module 508 may include code to migrate the second connection back to the first wireless channel if an energy profile is detected. For example, if a radar signal is detected, the migrator module 508 may cause the master device and subordinate devices to migrate back to a non-DFS channel until another CAC is successfully completed. In some examples, the checker module 508 may include code to perform the channel availability check on a third wireless channel if the channel availability check detects a priority energy profile on the second wireless channel. For example, the third wireless channel may be another DFS channel that is potentially available for use. In some example, the monitor module 506 may also include code to service the subordinate device if the connection request is detected. For example, the monitor module 506 may cause a master device to service a subordinate device by responding to a detected connection request.

It is to be understood that any number of additional software components not shown in FIG. 5 can be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

This example provides for an example system for performing a channel availability check. The example system includes a processor and a computer-readable memory storage device storing executable instructions that can be executed by the processor to cause the processor to initiate a first connection on a first wireless channel with a subordinate device and transmit a beacon to the subordinate device, and to monitor the first wireless channel for a first predetermined amount of time for a connection request from the subordinate device in response to the beacon. The example system also includes executable instructions that can be executed by the processor to cause the processor to perform the channel availability check to detect energy profiles on a second wireless channel for a second predetermined amount of time after the first predetermined amount of time, the processor to cycle between transmitting the beacon and monitoring the first wireless channel and performing the channel availability check on the second wireless channel until a threshold time is exceeded, the connection request is detected, or an energy profile is detected. The example system also includes executable instructions that can be executed by the processor to cause the processor to migrate the first connection to the second wireless channel if the threshold time is exceeded. Alternatively, or in addition, the processor can stop cycling between performing the channel availability check and monitoring the first wireless channel if a connection request is detected, and service the subordinate device on the first wireless channel. Alternatively, or in addition, the processor can stop cycling between performing the channel availability check and monitoring the first wireless channel and service the subordinate device via the first wireless channel if the energy profile is detected. Alternatively, or in addition, the processor can monitor for the energy profile on the second wireless channel after the first connection is migrated. Alternatively, or in addition, the threshold time can exceed a predetermined full CAC value. Alternatively, or in addition, the beacon and the connection request are to be transmitted at a predetermined transmitted power. Alternatively, or in addition, the second wireless channel can be a dynamic frequency selection (DFS) channel.

Example 2

This example provides for an example method for performing a channel availability check. The example method includes initiating, via a processor of a master device, a first connection on a first wireless channel with a subordinate device. The example method includes transmitting, via the processor, a beacon to the subordinate device. The example method also includes monitoring, via the processor, the first wireless channel for a first predetermined amount of time for a connection request from the subordinate device in response to the beacon. The example method further includes performing the channel availability check to detect energy profiles on a second wireless channel for a second predetermined amount of time after the first predetermined amount of time, the processor to cycle between transmitting the beacon and monitoring the first wireless channel and performing the channel availability check on the second wireless channel until a threshold time is exceeded, the connection request is detected, or an energy profile is detected. Alternatively, or in addition, the example method may include stopping the channel availability check and servicing the subordinate device on the first wireless channel if the connection request is detected. Alternatively, or in addition, the example method may include stopping the channel availability check and performing the channel availability check on a third wireless channel if the energy profile is detected. Alternatively, or in addition, the example method may include migrating the first connection to a second connection on the second wireless channel if the threshold time is exceeded without any detected energy profile and without any detected connection request. Alternatively, or in addition, the example method may include performing in-service monitoring to detect energy profiles on the second wireless channel and migrating the second connection to a third connection on the first wireless channel if an priority energy profile is detected on the second wireless channel. Alternatively, or in addition, the master device and the subordinate device may operate at a predetermined transmitter power. Alternatively, or in addition, the threshold time may exceed a predetermined full CAC value. Alternatively, or in addition, the second wireless channel may be a dynamic frequency selection (DFS) channel.

Example 3

This example provides for an example one or more computer-readable memory storage devices for storing computer readable instructions that, when executed by one or more processing devices, instruct the performance of a channel availability check. The computer-readable instructions may include code to initiate a first connection on a first wireless channel with a subordinate device and transmit a beacon to the subordinate device. The computer-readable instructions may include code to monitor the first wireless channel for a first predetermined amount of time for a connection request from the subordinate device in response to the beacon. The computer-readable instructions may include code to perform the channel availability check to detect energy profiles on a second wireless channel for a second predetermined amount of time after the first predetermined amount of time, the one or more processing devices to cycle between transmitting the beacon and monitoring the first wireless channel and performing the channel availability check on the second wireless channel until a threshold time is exceeded, the connection request is detected, or an energy profile is detected. The computer-readable instructions may include code to migrate the first connection to a second connection on the second wireless channel if the threshold time is exceeded. Alternatively, or in addition, the computer-readable instructions may include code to perform in-service monitoring on the second wireless channel after the first connection is migrated. Alternatively, or in addition, the computer-readable instructions may include code to migrate the second connection back to the first wireless channel if an energy profile is detected. Alternatively, or in addition, the computer-readable instructions may include code to perform the channel availability check on a third wireless channel if the channel availability check detects a priority energy profile on the second wireless channel. Alternatively, or in addition, the computer-readable instructions may include code to service the subordinate device if the connection request is detected.

What has been described above includes examples of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the disclosed subject matter. In this regard, it will also be recognized that the innovation includes a system as well as a computer-readable storage media having computer-executable instructions for performing the acts and events of the various methods of the disclosed subject matter.

There are multiple ways of implementing the disclosed subject matter, e.g., an appropriate API, tool kit, driver code, operating system, control, standalone or downloadable software object, etc., which enables applications and services to use the techniques described herein. The disclosed subject matter contemplates the use from the standpoint of an API (or other software object), as well as from a software or hardware object that operates according to the techniques set forth herein. Thus, various implementations of the disclosed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the disclosed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for performing a channel availability check, comprising:
    a processor to:
        initiate a first connection on a first wireless channel with a subordinate device and transmit a beacon to the subordinate device, and to monitor the first wireless channel for a first predetermined amount of time for a connection request from the subordinate device in response to the beacon;
        perform the channel availability check to detect energy profiles on a second wireless channel for a second predetermined amount of time after the first predetermined amount of time, the processor to cycle between transmitting the beacon and monitoring the first wireless channel and performing the channel availability check on the second wireless channel until a threshold time is exceeded, the connection request is detected, or an energy profile is detected, wherein the processor is to stop cycling between performing the channel availability check and monitoring the first wireless channel if the connection request is detected, and service the subordinate device on the first wireless channel; and
        migrate the first connection to the second wireless channel if the threshold time is exceeded.

2. The system of claim 1, wherein the processor is to stop cycling between performing the channel availability check and monitoring the first wireless channel and service the subordinate device via the first wireless channel if the energy profile is detected.

3. The system of claim 1, wherein the processor is to monitor for the energy profile on the second wireless channel after the first connection is migrated.

4. The system of claim 1, wherein the threshold time exceeds a predetermined full CAC value.

5. The system of claim 1, wherein the beacon and the connection request are to be transmitted at a predetermined transmitted power.

6. The system of claim 1, wherein the second wireless channel comprises a dynamic frequency selection (DFS) channel.

7. A method for performing a channel availability check, comprising:
    initiating, via a processor of a master device, a first connection on a first wireless channel with a subordinate device;
    transmitting, via the processor, a beacon to the subordinate device;
    monitoring, via the processor, the first wireless channel for a first predetermined amount of time for a connection request from the subordinate device in response to the beacon; and
    performing, via the processor, the channel availability check to detect energy profiles on a second wireless channel for a second predetermined amount of time after the first predetermined amount of time, the processor to cycle between transmitting the beacon and monitoring the first wireless channel and performing the channel availability check on the second wireless channel until a threshold time is exceeded, the connection request is detected, or an energy profile is detected, wherein the processor is to stop cycling between performing the channel availability check and monitoring the first wireless channel if the connection request is detected, and service the subordinate device on the first wireless channel.

8. The method of claim 7, further comprising stopping the channel availability check and performing the channel availability check on a third wireless channel if the energy profile is detected.

9. The method of claim 7, further comprising migrating the first connection to a second connection on the second wireless channel if the threshold time is exceeded without any detected energy profile and without any detected connection request.

10. The method of claim 9, further comprising performing in-service monitoring to detect energy profiles on the second wireless channel and migrating the second connection to a third connection on the first wireless channel if an priority energy profile is detected on the second wireless channel.

11. The method of claim 7, wherein the master device and the subordinate device operate at a predetermined transmitter power.

12. The method of claim 7, wherein the threshold time exceeds a predetermined full CAC value.

13. The method of claim 7, wherein the second wireless channel comprises a dynamic frequency selection (DFS) channel.

14. One or more computer-readable storage media for storing computer readable instructions that, when executed by one or more processing devices, instruct the performance of a channel availability check, the computer-readable instructions comprising code to:
    initiate a first connection on a first wireless channel with a subordinate device and transmit a beacon to the subordinate device;
    monitor the first wireless channel for a first predetermined amount of time for a connection request from the subordinate device in response to the beacon;
    perform the channel availability check to detect energy profiles on a second wireless channel for a second predetermined amount of time after the first predetermined amount of time, the one or more processing devices to cycle between transmitting the beacon and monitoring the first wireless channel and performing the channel availability check on the second wireless channel until a threshold time is exceeded, the connection request is detected, or an energy profile is detected, wherein the processing devices are to stop cycling between performing the channel availability check and monitoring the first wireless channel if the connection request is detected, and service the subordinate device on the first wireless channel; and migrate the first connection to a second connection on the second wireless channel if the threshold time is exceeded.

15. The one or more computer-readable storage media of claim 14, further comprising code to perform in-service monitoring on the second wireless channel after the first connection is migrated.

16. The one or more computer-readable storage media of claim 15, further comprising code to migrate the second connection back to the first wireless channel if an energy profile is detected.

17. The one or more computer-readable storage media of claim 14, further comprising code to perform the channel availability check on a third wireless channel if the channel availability check detects a priority energy profile on the second wireless channel.

* * * * *